United States Patent [19]

Nemirofsky

[11] Patent Number: 5,412,416
[45] Date of Patent: May 2, 1995

[54] VIDEO MEDIA DISTRIBUTION NETWORK APPARATUS AND METHOD

[75] Inventor: Frank R. Nemirofsky, Danville, Calif.

[73] Assignee: NBL Communications, Inc., San Francisco, Calif.

[21] Appl. No.: 926,664

[22] Filed: Aug. 7, 1992

[51] Int. Cl.[6] .............................................. H04N 1/00
[52] U.S. Cl. ..................................... 348/10; 455/3.1; 455/4.2; 455/12.1
[58] Field of Search .................... 358/86, 185; 455/3.1, 455/5.1, 6.1, 6.2, 6.3, 4.2, 53.1, 12.1, 13.1, 45; 380/10; 375/122

[56] References Cited

U.S. PATENT DOCUMENTS

| Re. 31,735 | 11/1984 | Davidson | 358/124 |
|---|---|---|---|
| 4,028,733 | 6/1977 | Ulicki | 360/10 |
| 4,720,873 | 1/1988 | Goodman et al. | 455/2 |
| 4,724,491 | 2/1988 | Lambert | 358/310 |
| 4,725,886 | 2/1988 | Galumbeck et al. | 358/147 |
| 4,814,883 | 3/1989 | Perine et al. | 358/181 |
| 4,916,539 | 4/1990 | Galumbeck | 358/142 |
| 4,937,821 | 6/1990 | Boulton | 370/124 |
| 5,029,014 | 7/1991 | Lindstrom | 358/342 |
| 5,099,319 | 3/1992 | Esch et al. | 455/86 |
| 5,119,188 | 6/1992 | McCalley et al. | |
| 5,132,992 | 7/1992 | Yurt et al. | 375/122 |
| 5,151,782 | 9/1992 | Ferraro | 358/86 |
| 5,155,591 | 10/1992 | Wachob | |

FOREIGN PATENT DOCUMENTS

| 62-36932 | 2/1987 | Japan. |
|---|---|---|
| 62-235835 | 10/1987 | Japan. |
| 63-276337 | 11/1988 | Japan. |
| 01-97028 | 4/1989 | Japan. |
| 01-103335 | 4/1989 | Japan. |
| 01-220925 | 9/1989 | Japan. |
| 02-295240 | 12/1990 | Japan. |
| 03-70438 | 3/1991 | Japan. |
| 03-117123 | 5/1991 | Japan. |
| 03-145828 | 6/1991 | Japan. |
| 03-196726 | 8/1991 | Japan. |

Primary Examiner—Edward F. Urban
Assistant Examiner—Chi Pham
Attorney, Agent, or Firm—Townsend and Townsend Khourie and Crew

[57] ABSTRACT

The present invention provides a distribution network for full motion video media, usually in the form of advertisements, allowing video programs to be transmitted from a distribution center (DC) to a multitude of receiving sites (RS), typically retail stores, dispersed over a wide geographic area. Preferably, programs are transmitted via satellite (8) and are receivable via antennae (10) at the receiving sites (RS). Television monitors (14) located at selected points in the receiving sites display the programs to an audience, which usually will include shoppers in the course of shopping. The invention provides for "customizing" video programs for particular target audiences or markets, such that the series of programs played in one receiving site could be quite different from that played in another. The distribution network provides automatic insertion of custom, store-specific video segments (22) into a general, network-wide video program (20) without the need for operational involvement of personnel at the receiving site (RS) through the use of control data encoded into the video signal at the distribution center (DC). An insertion control unit (56) at each receiving site (RS) reads the control data and switches a receiver (54) among channels carrying the network-wide program (20) and market specific segments (22) according to the control data.

49 Claims, 10 Drawing Sheets

VIDEO MEDIA DISTRIBUTION NETWORK APPARATUS AND METHOD

BACKGROUND OF THE INVENTION

The present invention relates generally to audio-visual media broadcasting and advertising. More specifically, the invention relates to satellite-based transmission systems for distributing point-of-purchase video advertising to retail stores.

Commercial network television has been recognized as a powerful and efficient medium for broadcasting advertising messages to a large, widely disbursed audience. As a result, network television traditionally has garnered a major share of advertising budgets. However, due to a variety of factors, commercial television advertising revenues have been dropping over the past several years, a trend which is expected to continue. One major drawback of television advertising is network television's ability to do nothing more than deliver a large number of impressions to a large and relatively undifferentiated audience. Advertising dollars are ineffectively spent on messages that reach the wrong audiences under the wrong circumstances. Further, national network television is well suited only for the limited number of product categories which are truly national in scope and relatively impervious to regional and seasonal variation. Moreover, the cost of multiple regional campaigns will often equal or exceed that of a national program.

Point of purchase promotion accomplishes what in-home television cannot, in large part because it is directed not toward passive, unreceptive viewers, but rather toward consumers who are actively making choices and seeking information. Ample evidence demonstrates consumers in a shopping environment are much more susceptible to televised messages than otherwise.

However, current point of purchase advertising programs have severe limitations. For the most part they are based on a static, print-oriented medium comprised of signage or packing labels, with product messages lost in the clutter. On-site demonstrations or educational devices are often prohibitively expensive, take up valuable selling space and are limited to a store by store approach.

One known system of electronic point of purchase advertising utilizes silent electronic dot repeating message signs, similar to reader boards found in major airports and brokerage houses, in the high-traffic aisles of supermarkets. Such silent reader boards, with limited two-dimensional displays, do not have the effectiveness of television in catching and retaining viewer attention.

Another known variation on electronic point-of-purchase advertising utilizes electronic display screens such as liquid crystal displays on individual shopping carts which convey messages to the shopper. Such systems again do not have the effectiveness of television, and further require a great deal of maintenance down-time due to their susceptibility to damage.

Other known systems have used satellite-transmitted television to broadcast advertising into supermarkets. However, such systems are typically based on commercial network programming and have typically located television monitors only at checkout counters. Further, known satellite-based systems do not permit on-line selective customizing of promotional messages by aisle, store, chain, geographic area or demographic profile.

SUMMARY OF THE INVENTION

The present invention responds to the need for an effective and cost-efficient point-of-purchase promotional medium. The invention provides a method and apparatus for distributing and broadcasting a customized video program from a distribution center to a plurality of geographically dispersed receiving sites. In a preferred embodiment, entertainment-based commercial promotional programming in full motion video format is broadcast via satellite to the point of purchase in retail outlets nationwide. The signal is received through an antenna at each location and broadcast throughout the store by televisions preferably located over the aisles and on the major walls. The location and volume level of the monitors are preferably designed to unobtrusively blend in with each stores decor and enhance its aesthetics while being easily visible to shoppers as they move through the aisles.

A unique aspect of the invention is its capability for on-line creation of audio-visual programs customized for individual retail chains, stores, or even aisles within a store, as well as for particular geographic areas and times of day. Unique programs tailored to a particular demographic market are assembled on-line and broadcast simultaneously to a multitude of different locations. This feature eliminates the need for producing separate video programs on separate videotapes for each customized program desired, and requires little or no operational intervention of personnel at the store.

In a preferred embodiment, the invention provides a video media distribution network comprising a distribution center having means for transmitting a network-wide video program and market specific segments to a plurality of receiving sites each having an associated address. The market-specific segments each include a destination address and a set of control data encoded into the segments. The receiving sites comprise means for receiving the network-wide video program and market-specific segments, means for reading the destination address in the market-specific segments, means operative when the destination address matches the associated address of the receiving site for inserting the market-specific segments into the network-wide video program according to commands contained in the control data to produce a customized program, and means for displaying the customized program.

In a further preferred embodiment, a network-wide program is transmitted from the distribution center over a first channel and a series of market-specific segments are transmitted over one or more additional channels. Each market specific segment is assigned an address and a package of control data encoded into a known data location in the video signal. Receivers in each retail store receive the signals for both the network-wide program and market-specific segments, preferably being transmitted via satellite. An insertion control unit in the retail store reads the address in each market specific segment to determine whether the segment is intended to be played in that store. Until such a segment is identified, the insertion control unit directs the receiver to receive the network-wide program on the first channel. When the address of a market-specific segment corresponds to the store, the insertion control unit reads the control data in the segment. A switching command contained in the control data will direct the receiver to switch to another channel to play the market-specific segment.

The network-wide and market-specific segments may be transmitted in either analog or digital signals. Usually, if analog signals are used, at least two transponders of a satellite are utilized, one for the network-wide program and a second for a series of market-specific segments. If digital signals are used, on the other hand, a single transponder of the satellite may be used. Usually, the digital signals are compressed in the distribution center using digital compression techniques. Depending upon the degree of compression, up to ten or more digital channels may be broadcast over a single satellite transponder. One digital channel is usually used for the network-wide program, and the remaining digital channels may then be used for the market-specific segments.

At the receiving site, in the analog embodiment, the insertion control unit directs the receiver to tune into either the first channel over the first transponder, or the second channel over the second transponder, depending upon the switching command of the market specific segments. In the digital embodiment, the insertion control unit may direct the receiver to switch among the digital channels while remaining tuned to the same transponder, or, where multiple transponders are utilized, to switch among various transponders.

The switching commands and other control data are usually encoded into both the market specific segments and the network-wide program so that the code will be available for detection by the insertion control unit regardless of the channel to which the receiver is tuned or switched at the time. The control data precedes the market specific segment to which it is assigned, permitting the data to be read by the insertion control unit, which then directs the receiver to retune or switch to the appropriate channel if the switching command so instructs. In the analog embodiment, the switching command and other control data are usually carried in a vertical blanking interval in the signal. In the digital embodiment, the control data is preferably encoded in a separate channel reserved for such data.

The invention further affords communication between the advertising distribution network and host computers in each retail location or a central computer at a remote site. This is particularly useful for product promotions and pricing changes, wherein a network advertiser offers a reduced price, coupon, two-for-one sale, or other such promotion. Such promotional information may be conveyed to the distribution network from an organization's central computer, carried in the control data with the video signal so that the controller in each store may read the information and communicate it to the store's host computer. The host computer may then automatically adjust prices at the cash registers or notify cashiers of the promotion.

Because of its ability to tailor its commercial messages to particular chains, stores, aisles, times of day and geographic regions, the distribution network of the present invention provides advertisers the capability to reach target audiences with customized messages. Further, such customized programming is assembled on-line at each receiving site according to control data encoded in the video signal, eliminating the need for pre-assembly of multiple unique programs, or the involvement of personnel at the receiving sites.

A further understanding of the nature and advantages of the invention may be realized by reference to the remaining portions of the specification and the drawings.

DESCRIPTION OF SPECIFIC EMBODIMENTS

The present invention provides a distribution network for transmitting real-time motion video, usually in the form of promotional advertisements, from a distribution center to a multitude of receiving sites, typically retail stores, dispersed over a wide geographic area. Preferably, programs are transmitted via satellite and are receivable via antennae at the receiving sites. Television monitors located at selected points in the receiving sites display the programs to an audience, which usually will include shoppers in the course of shopping. Importantly, the invention provides for customizing programs for particular target audiences or markets, such that the program played in one receiving site could be quite different from that played in another. Equally important is the invention's on-line insertion of custom, market-specific segments in a general, network-wide program without the need for pre-assembly of each unique program or operational involvement of personnel at the receiving sites.

Figure 1:
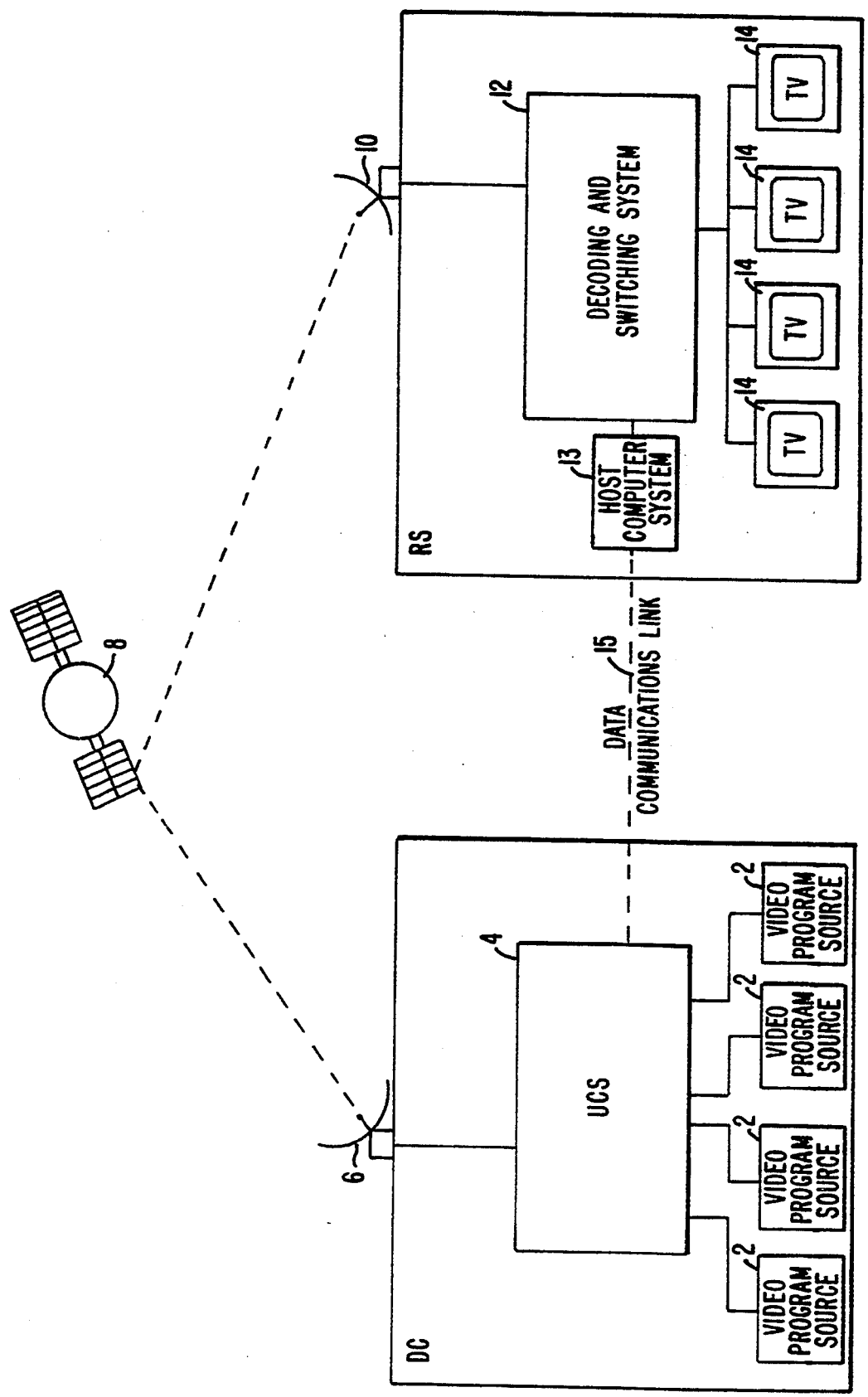
FIG. 1 is a block diagram of the video distribution network of the present invention.

In a preferred embodiment, as illustrated in FIG. 1, the distribution network includes a plurality of video program sources 2 coupled to an uplink control system (UCS) 4 in a distribution center D.C. UCS 4 performs the functions of accessing and playing back video source material, encoding the video signal with control data for directing switching equipment in receiving sites RS, and transmitting the video signal encoded with control data to a plurality of receiving sites RS via uplink antenna 6 and satellite 8. Each receiving site RS includes a downlink antenna 10 for receiving signals from the satellite, a decoding and switching system 12 which reads the control data and switches between video channels, and a network of televisions 14 for displaying video programs. A host computer system 13 is coupled to decoding and switching system 12 and communicates with UCS 4 via data communication link 15.

Figure 2:
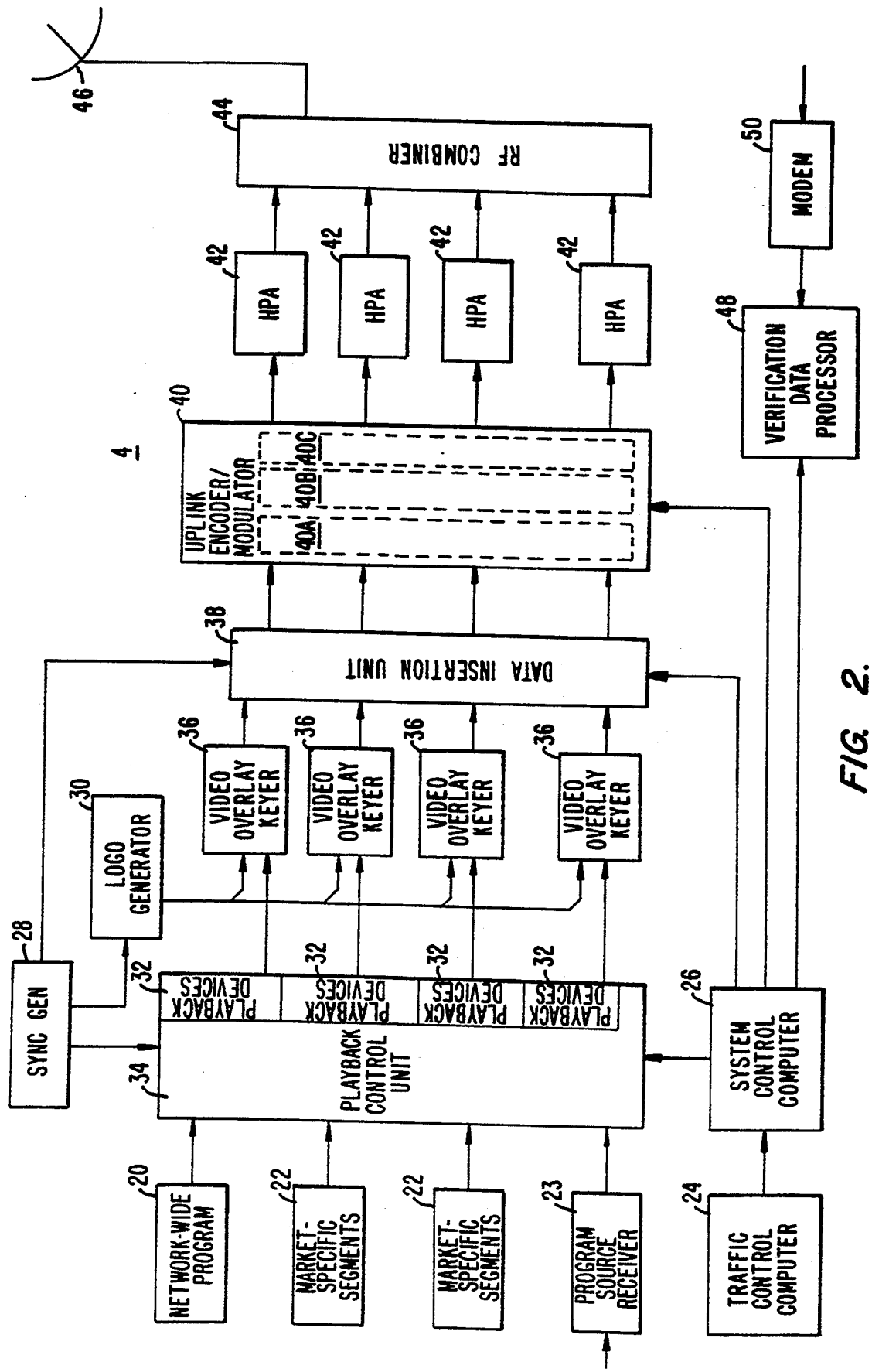
FIG. 2 is a block diagram of the uplink control system of the distribution network of FIG. 1.

The uplink control system 4 in the distribution center DC is illustrated in FIG. 2. A network-wide program 20, usually comprising a series of full motion video segments stored on video storage media such as video tapes or optical disks, is played on a video playback device 32, which will comprise one or more video cassette recorders (VCRs), optical disk (videodisk) players, or other conventional recording media playback devices, such as the Sony BVW-60 VCR or Pioneer VDR-V1000 Videodisc Player. The network-wide program is played over a first source channel of the network.

Market-specific segments 22 stored on video storage media are played on video playback devices 32 over one or more additional source channels. The network may further include a program source receiver 23 capable of receiving video segments transmitted to the distribution from remote locations, by e.g., satellite or cable.

It will be understood that the network-wide program 20 and the market-specific segments 22 are preferably in full motion video format, and include both an audio and video component recorded onto conventional recording media such as magnetic tape or optical disks. While the term "video" is used herein unaccompanied by the word "audio" the term "video" is intended to refer to recorded audio-visual media as in common usage, unless stated otherwise. The network-wide program 20 and market-specific segments 22 may further include computer graphics and other forms of audio-visual media.

Video playback devices 32 are coordinately controlled through a playback control unit 34, which may comprise, for example, a Sony Beta Cart 40 or Panasonic MARC II-100. Playback control unit 34 may be connected to a plurality of playback devices 32, and programmed to actuate selected playback devices upon receiving a signal from an external source, e.g. system control computer 26 (described below).

Uplink control system 4 further includes a sync generator 28 coupled to playback control unit 34 to provide a reference for synchronization purposes. Sync generator 28 ensures that the horizontal and vertical pulses of the video signals from playback devices 32, as well as signals generated by peripheral devices such as logo generator 30 and data insertion unit 38 (described below), are synchronized to facilitate combining signals from various sources. Sync generator 28 is preferably a commercially available product such as the Grass Valley Group 9510 or Lietch SPG-120N.

Sequencing, timing and synchronization of the network-wide program 20 and market-specific segments 22 are controlled by a system control computer 26, which is programmed through a traffic control computer 24. System control computer 26 and traffic control computer 24 may be Apple Macintosh Quadras, IBM 386 or 486 Personal Computers, or other comparable computers of wide commercial availability. Traffic control computer 24 allows user input with respect to the sequencing and timing of the market-specific segments and the network-wide program 20 (described more fully below), and outputs commands to system control computer 26 to selectively actuate video playback devices 32. Traffic control computer 24 is programmed so that system control computer 26 actuates video playback devices 32 to play a series of market-specific segments 22 over one or more source channels in a desired order and at the proper time, according to the desired position for insertion into the network-wide program 20. Traffic control computer 24 may further be programmed to assemble the network-wide program 20 by selectively actuating a plurality of video playback devices 32 such that a series of segments making up the network-wide program 20 is played over the network-wide program source channel.

In an exemplary embodiment, a logo generator 30 coupled to sync generator 28 generates a video overlay of a selected logo, such as that of a supermarket chain or the network operator, which is inserted at selected points in the network-wide program 20 and/or market specific segments 22 by video overlay keyers 36 coupled to video playback devices 32. Logo generator 30 may be, for example, a Texscan SG-4B or a Chyron Scribe. Video overlay keyers 36 may be commercially available products such as the Comprehensive Video PVK-1, or Graham-Patten Systems 1236.

In a first embodiment, video signals are transmitted in analog form throughout the distribution network. In the analog embodiment, a data insertion unit 38 is coupled to video playback devices 32 succeeding video overlay keyers 36. Data insertion unit 38 encodes a destination address along with a package of control data in the network-wide program 20 and market-specific segments. The destination address will correspond to one or more receiving sites, groups of receiving sites, or sub-parts of receiving sites in the network. The control data may include, as elaborated below, switching commands, program/segment storage commands, messages directed to a host computer at the receiving site, modem commands for a modem at the receiving site, receiving site control profile updates, and the like. Data insertion unit 38 operates under commands from system control computer 26, programmed through traffic control computer 24, which dictate what addresses and control data are to be assigned to each market-specific segment, and where the data should be inserted relative to the segment. Data insertion unit 38 is coupled to sync generator 28 to provide a synchronization reference for proper positioning of control data in the video signal.

In the analog embodiment, data insertion unit 38 preferably encodes the control data in a vertical blanking interval in the analog video signal. Alternatively, data insertion unit 38 may encode to control data into a separate data sub-carrier channel. Usually, the data is encoded in both the network-wide program 20 and the market-specific segments at contemporaneous positions just preceding the market-specific segment, for reasons which will become apparent below. Analog data insertion unit 38 may be, for example, an Interactive Satellite VBI-1000 Data Transmission System, available from Interactive Satellite of Richardson Texas.

Upon leaving data insertion unit 38, network-wide program 20 and market-specific segments 22 require modulation for satellite transmission. In the analog embodiment, an uplink modulator 40 receives the network-wide program and market-specific segment signals and modulates them to a frequency appropriate for satellite transmission, usually in the KU-band or C-band. Uplink modulator may be a commercially available product such as the Scientific Atlanta 7555B Exciter.

In the digital embodiment, control data encoding is accomplished by an encoder 40C in uplink encoder/modulator 40. Encoder/Modulator 40 may be, for example, a Scientific Atlanta 7555B Exciter (with encoder option). Encoder/modulator 40 will include an analog-to-digital converter 40A to convert the analog signal produced by video playback devices 32 into digital signals.

Encoder/modulator 40 further includes a digital data compressor 40B for compressing the video data to an optimum quantity for maximizing transmissibility while maintaining sufficiently high image quality. Through known data compression techniques, up to ten or more digital source channels may be transmitted over a single satellite transmission channel (transponder).

Preferably, encoder/modulator 40 transfers the network-wide program 20 onto one digital source channel, while the market-specific segments 22 are transferred onto one or more additional digital source channels. Preferably, a digital source channel separate from those used for the network-wide program 20 and market-specific segments is reserved for control data. Under the direction of system control computer 26, encoder/modulator 40 inserts the control data onto this digital control data channel at a point just preceding the beginning of the corresponding market-specific segment.

Encoder/modulator 40 further includes a frequency modulator which modulates the digital signals to a satellite transmission frequency, which is usually in the KU-band or C-band.

HPAs 42 then amplify the video signals, whether digital or analog, to a power level appropriate for satellite transmission, preferably around 750 watts. HPAs 42 may be, for example, MBL 750 Watt TWT Power Amplifier Systems.

An RF combiner 44 is coupled to HPAs 42, and combines the signals of separate source channels into a single transmission signal for transmission via satellite 8. In the analog embodiment, the network-wide program 20 is transmitted over a separate transmission channel—that is, over a different satellite transponder—than the market specific segments. Each source channel containing analog market-specific segments is transmitted over different transmission channels. RF combiner 44 may be a commercially available product such as the Specialty Microwave RF Combiner.

In the digital embodiment, the network-wide program 20 on a first source channel, the market-specific segments 22 on various additional source channels, as well as the control data carried on the digital control data channel, are preferably combined by RF combiner 44 into a single transmission signal for satellite transmission on one or more transponders.

An up-link antenna 46 of conventional construction, such as a Scientific Atlanta 7 Meter KU Band 4-Port Dish Antenna, is coupled to RF combiner 44 for transmitting the modulated video signals over one or more frequency modulated KU-band RF channels to transponder(s) on satellite 8, each transponder typically providing a bandwidth of 36.0 MHz.

Figure 3:
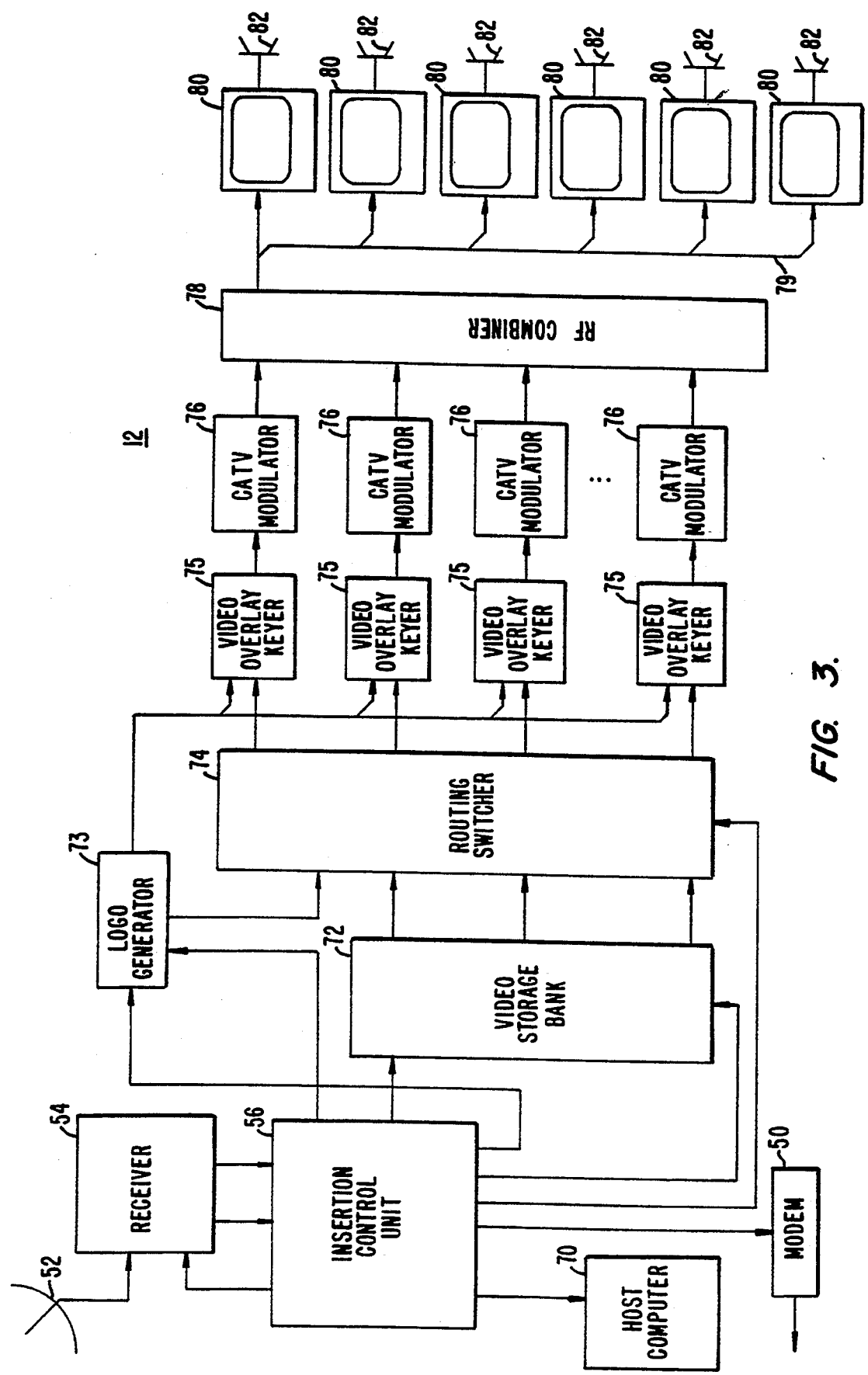
FIG. 3 is a block diagram of the decoding and switching system of the distribution network of FIG. 1.

Referring now to FIG. 3, the decoding and switching system 12 of each receiving site RS will be described. Transponder(s) on satellite 8 transmit the video signals over RF channels to down-link antenna 52, which may be, for example, a ChannelMaster SMC Series 1.8-meter Dish Antenna. Each receiving site has one such down-link antenna 52, typically at an exterior location such as the roof of the receiving site.

Figure 4:
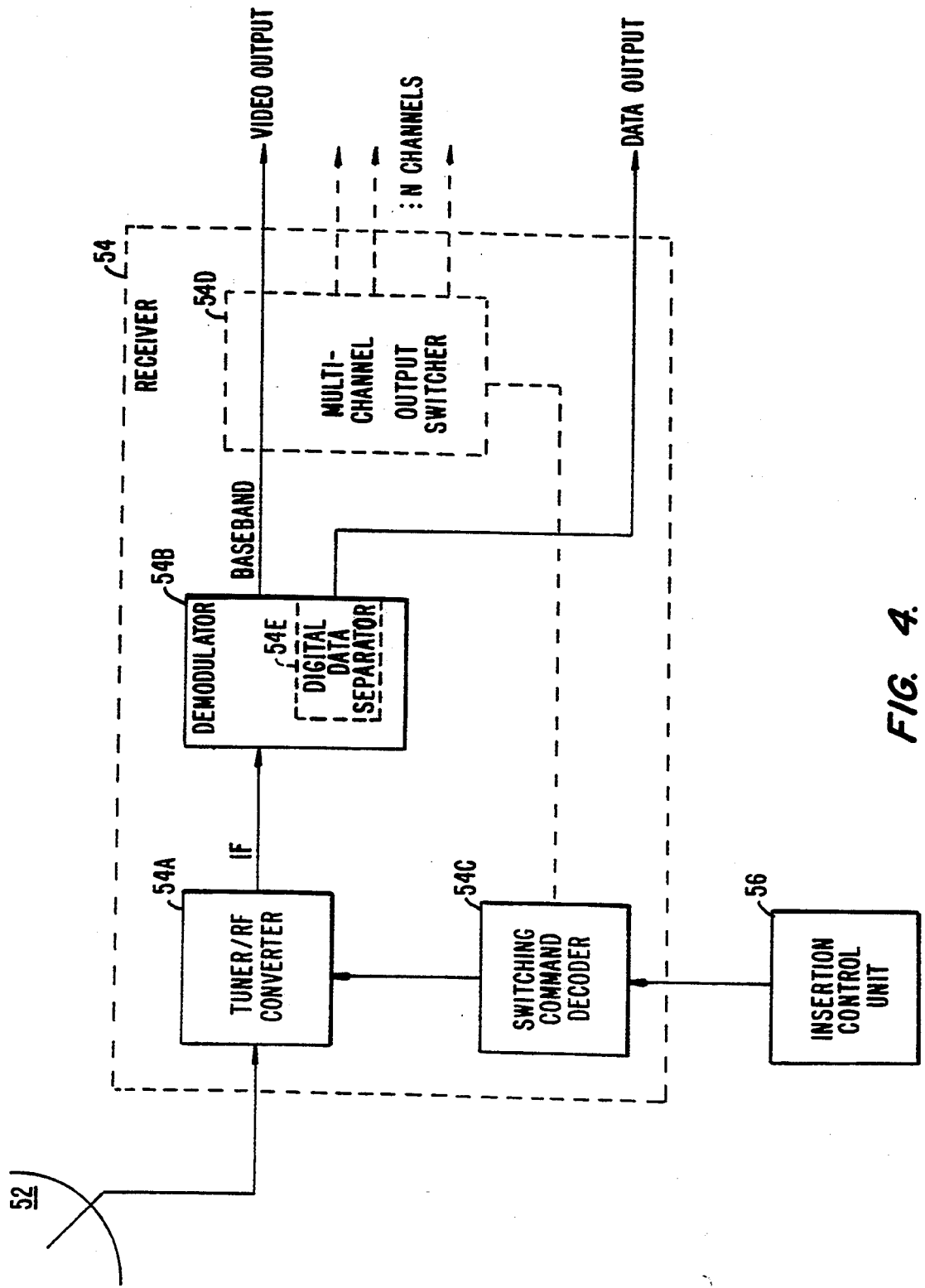
FIG. 4 is a block diagram of the receiver of the decoding and switching system of FIG. 3.

Down-link antenna 52 is coupled to a receiver 54, which may be, for example, a Drake ESR-1240 or General Instruments DSR-1000. As illustrated in FIG. 4, receiver 54 includes a tuner/RF converter 54A, which may be tuned to the appropriate frequency for reception of signals over the transmission channels from satellite 8. Tuner/RF converter 54A converts the RF signal received to an intermediate frequency (IF) signal. The IF signal is demodulated to a baseband in a demodulator 54B coupled to tuner/RF converter 54A, and output to insertion control unit 56 (FIG. 3).

In the digital embodiment, demodulator 54B will further include a digital data separator 54E which identifies the digital control data channel and extracts the control data therein. The digital control data is output to insertion control unit 56.

Receiver 54 also has a switching command decoder 54C coupled to insertion control unit 56 and tuner/RF converter 54A. The switching command decoder 54C receives a switching command from insertion control unit 56 as described below, and, in the analog embodiment, retunes tuner/RF converter 54A to the transmission channel specified in the command. In the digital embodiment, the switching command decoder 54C sends a switching signal to a multichannel output switcher 54D. Multichannel output switcher 54D responds to the switching signal by switching to the digital source channel specified in the switching command, with tuner/RF converter 54A remaining tuned to a particular transmission channel.

If multiple transmission channels (satellite transponders) are used to transmit digital signals, the switching command decoder 54C interprets the switching command from insertion control unit 56 to determine whether the specified channel is carried on a different transmission channel. If so, the switching command decoder 54C retunes tuner/RF converter 54A to receive the new transmission channel. In addition, switching command decoder 54C determines whether a different digital source channel is required and, if so, sends a digital source channel switching signal to multichannel output switcher 54D.

Figure 5:
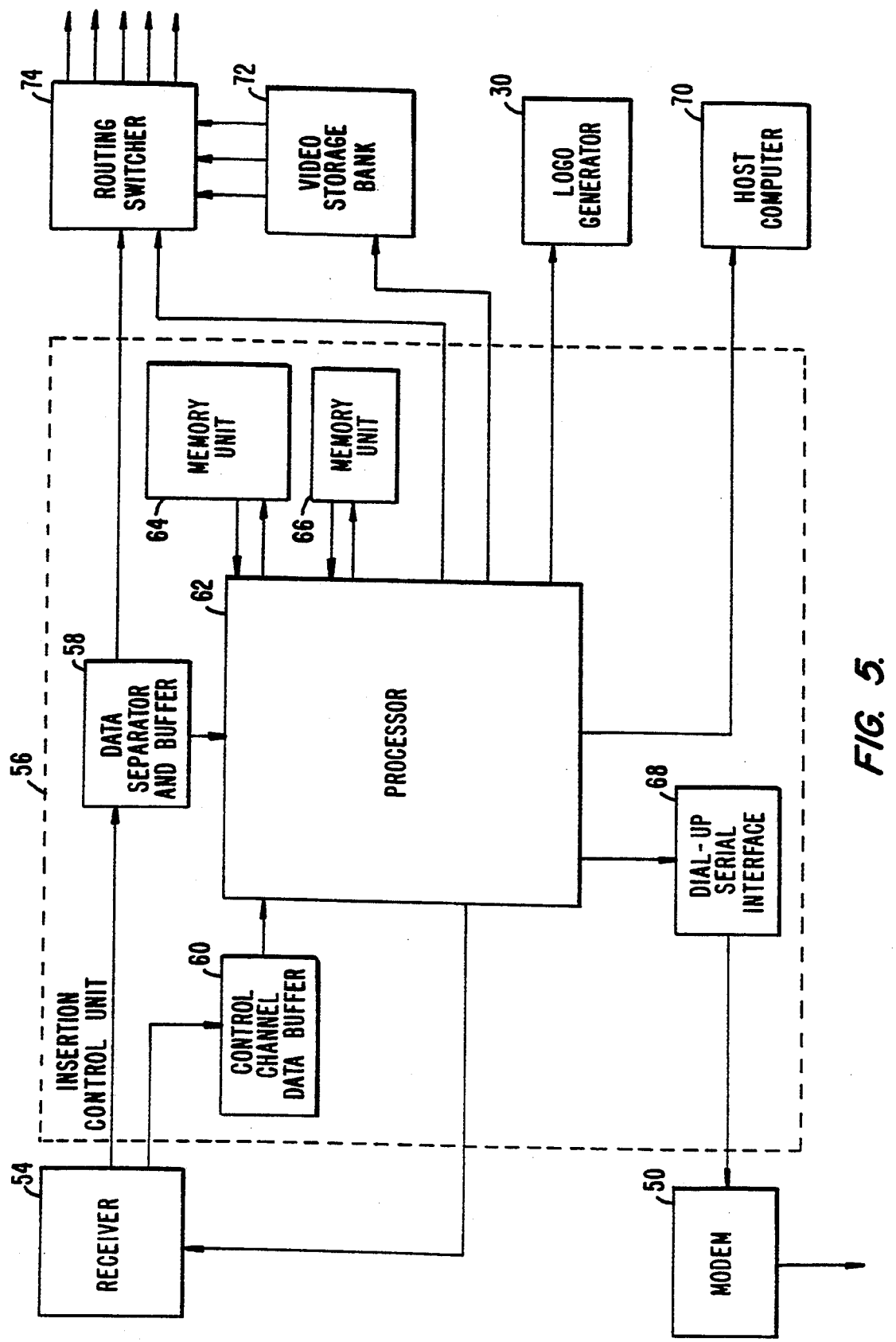
FIG. 5 is a block diagram of the insertion control unit of the decoding and switching system of FIG. 3.

As illustrated in FIG. 5, insertion control unit 56 includes a data separator and buffer 58 which, in the analog embodiment, extracts the destination address, switching command and other control data embedded in the video signal. In the digital embodiment, a control channel data buffer 60 receives control data from demodulator/digital data separator 54B, 54E in receiver 54. The address and control data are read by a processor 62, which is in communication with non-volatile memory units 64, 66 storing address and command data for the receiving site, as well as a software program (described below). Processor 62 compares the destination address read from the video signal and, if it matches that of the receiving site, processes the accompanying control data, as described more fully below.

In the analog embodiment, receiver 54 is tuned, in a default state, to receive the network-wide program 20 over the appropriate transmission channel, from a particular satellite transponder. When a market-specific segment is to be inserted into the network-wide program 20, a switching command will be contained in the control data in a vertical blanking interval in the network-wide program 20 preceding the point where the market-specific segment is to be inserted. Insertion control unit 56 reads the switching command and switches receiver 54 to tune to the transmission channel (satellite transponder) of the market-specific segment at the appropriate time. At the end of the market-specific segment, the insertion control unit 56 will retune receiver 54 back to the network-wide program channel, unless the switching command in a vertical blanking interval preceding the end of the market-specific segment indicates that the succeeding segment is also to be played at the receiving site.

In the digital embodiment, multiple source channels, including the network-wide program channel, market-specific segment channels and digital control data channel, may all be transmitted over the same transmission channel (i.e. through the same satellite transponder). Therefore, where a single satellite transponder is utilized, it is unnecessary to retune receiver 54 when switching between market-specific segments and the network-wide program. Insertion control unit 56 reads data contained in the digital control data channel to determine whether an upcoming market-specific segment is to be played at the receiving site. If so, insertion control unit 56 switches receiver 54 from the network-wide program 20 digital source channel to the appropriate market-specific segment digital source channel through multi-channel output switcher 54D, without retuning receiver 54 to a different satellite transmission channel. Insertion control unit 56 continues to read the digital control data channel to determine whether the succeeding market-specific segment is to be played at the location, or whether receiver 54 should be switched back to the network-wide program 20 digital channel at the end of the current segment. Where multiple transponders are utilized to transmit digital signals, of course, the receiver 54 will either switch to a different digital channel on the same transponder, or tune to a different transponder, depending upon which transponder a market-specific segment is carried.

As described above, the control data carried with the network-wide program 20 and market-specific segments may include various types of information in addition to switching commands. Such information may include, for example, program/segment storage commands, modem commands, messages directed to the store's host computer, control profile commands, and the like.

A program/segment storage command will direct processor 62 of the insertion control unit 56 to generate a storage command. The storage command will be transmitted to a video storage bank 72 where market-specific segments or portions of the network-wide program 20 may be stored and recalled for time-delayed playback. Storage bank 72 may comprise one or more VCRs, optical recording/playback devices, or other known data storage device, such as the Pioneer VDR-V1000 Videodisc Recorder or Sony BVW-60 VTR. The storage command will activate the storage bank 72 to store an upcoming market-specific segment or portion of the network-wide program 20, or to recall a stored segment from the storage bank 72 for insertion into the network-wide program 20 at a selected point.

A routing switcher 74 (FIG. 3), directed by storage commands from insertion control unit 56, selectively switches between stored segment sources and the network-wide program 20 or market-specific segments 22 received through receiver 54. Routing switcher 74 may be, for example, a Sierra Video systems Series 32 8×16 or Grass Valley Group TEN-20.

If processor 62 reads a modem command, it will activate a modem 50 through a dial-up serial interface 68. The modem 50 is in communication with UCS 4 in the distribution center via telephone lines, permitting information such as reception verification, failure notification, alarm messages or other receiving site-originated information to be conveyed to the distribution center. Modem 50 may be a commercially available, Hayes-compatible modem. The modem 50 will preferably be in communication with a verification data processing computer 48 in the distribution center (FIG. 2), which may be an Apple Macintosh Quadra or IBM 386 or 486 Personal Computer or compatible. Verification data processing computer 48 is further coupled to system control computer 26, which sends transmission record messages specifying the video programming and control data transmitted to each receiving site. The verification data processing computer 48 will receive verification data or other message data from the insertion control unit in the receiving site via modem 50, and compare this data with the transmission record messages from system control computer 26 to determine whether transmission was successful. The resulting data may be stored for statistical record-keeping and/or output to a display or printer.

A control profile command read by processor 62 refreshes a control profile stored in the memory unit of each insertion control unit. The control profile defines the operation of the insertion control unit 56 in response to reading particular codes in the control data. When a particular code contained in an insertion control unit's control profile is read from the control data in the video signal, it will trigger a set of commands stored in memory units 64,66 to be executed by the insertion control unit 56. This eliminates the need to send all such commands with the video signal. The control profile is essential to the operation of the insertion control unit 56, and may be subject to corruption by hardware faults, power fluctuations or the like. Thus, the control profile may be periodically updated using control profile commands.

The control data received by insertion control unit 56 may also include commands directed to the receiving site's host computer 70. For example, supermarkets commonly have an on-site host computer to which the cash registers are linked. Product information such as pricing, promotions, quantities, in-store location, etc., is input to such a host computer and stored for reference or communicated to the registers. The registers may be automatically adjusted upon receiving such information, to reflect changes in price, discounts, coupon offers, and the like. If processor 62 of insertion control unit 56 reads a host computer command among the control data in the video signal, the accompanying data will be transmitted to the host 70 from insertion control unit 56 via a data communication link.

Each channel transmitted from routing switcher 74 contains an assembled customized video program in the form it will be broadcast at the receiving site. The customized program comprises the program segments of the network-wide program, with selected market-specific segments inserted at various points therein. If the same program is to broadcast throughout the receiving site, the program is transmitted over a single channel from insertion control unit 56 or routing switcher 74. If a plurality of unique programs (e.g. aisle-specific programs) will be shown in the receiving site, each will be transmitted over a different channel from insertion control unit 56 or routing switcher 74.

Referring again to FIG. 3, insertion control unit 56 is coupled to video overlay keyers 75 and CATV modulators 76 succeeding storage bank 72 and routing switcher 74. Video overlay keyers 75, under the control of insertion control unit 56, insert a logo generated by logo generator 73, matching that produced by logo generator 30 in the UCS 4. Logo generator 73 and video overlay keyers 75 may be comparable to UCS logo generator 30 and video overlay keyers 36, described above.

CATV modulators 76 coupled to video overlay keyers 75 modulate the signal, whether analog or digital, to an appropriate frequency for local distribution at the receiving site through a cable network 79. CATV modulators 76 may comprise, for example, commercially-available products such as the Drake VM-200 or PICO MACOM M600.

CATV modulators are coupled to an RF combiner 78. RF combiner 78, which may be, for example, a Blonder-Tongue OC-8 or Pico Macom PHC-12, combines the channels (if more than one) to a single transmission signal for local distribution over the cable network 79. As in common cable television systems, each unique program channel occupies a discrete portion of the transmission signal, and remains identifiable. Televisions 80 in the receiving site are tuned to receive the cable transmission channel, and may be switched to display a particular cable program channel among those transmitted over the transmission channel. Televisions 80 may be any of a variety of commercially available products, such as the Sony 2710 or the Mitsubishi CS2710R. Also coupled to the cable network 79 of the receiving site are audio systems 82 for reproducing the audio signal in the network-wide and market-specific segments. Audio systems 82 may comprise, for example, the Anchor AN-1000 or BiAmp D-60 with JBL Control 1.

In a preferred embodiment of the distribution network, the receiving sites are retail stores, such as supermarkets. The network-wide program 20 and market-specific segments 22 will usually include commercial advertising, as well as entertainment, news, sports and educational programming. Televisions 80 will be positioned in visible locations throughout the stores, including overhead each aisle, near checkout counters, and along interior walls. Programs may include separate audio tracks in languages other than English, and televisions will have selectable bilingual capability.

Through the use of switching commands encoded in the satellite-transmitted video signals, and the multiple-channel cable network within each store, programs may be customized for individual retail chains, stores, sections of stores (e.g. produce or dairy) aisles, times of day, and geographic regions. Importantly, these customized programs are assembled automatically by receiver 54 switching among channels according to the switching commands read by the insertion control unit 56. In this way, a plurality of customized programs may be broadcast simultaneously without pre-assembly of each unique program at the distribution center, without requiring the use of numerous satellite transponders, and without involvement of personnel at the receiving site.

SOFTWARE ARCHITECTURE

The software architecture of the distribution network will be described with reference to FIGS. 6 to 8.

A. UPLINK CONTROL SYSTEM SOFTWARE

Figure 6:
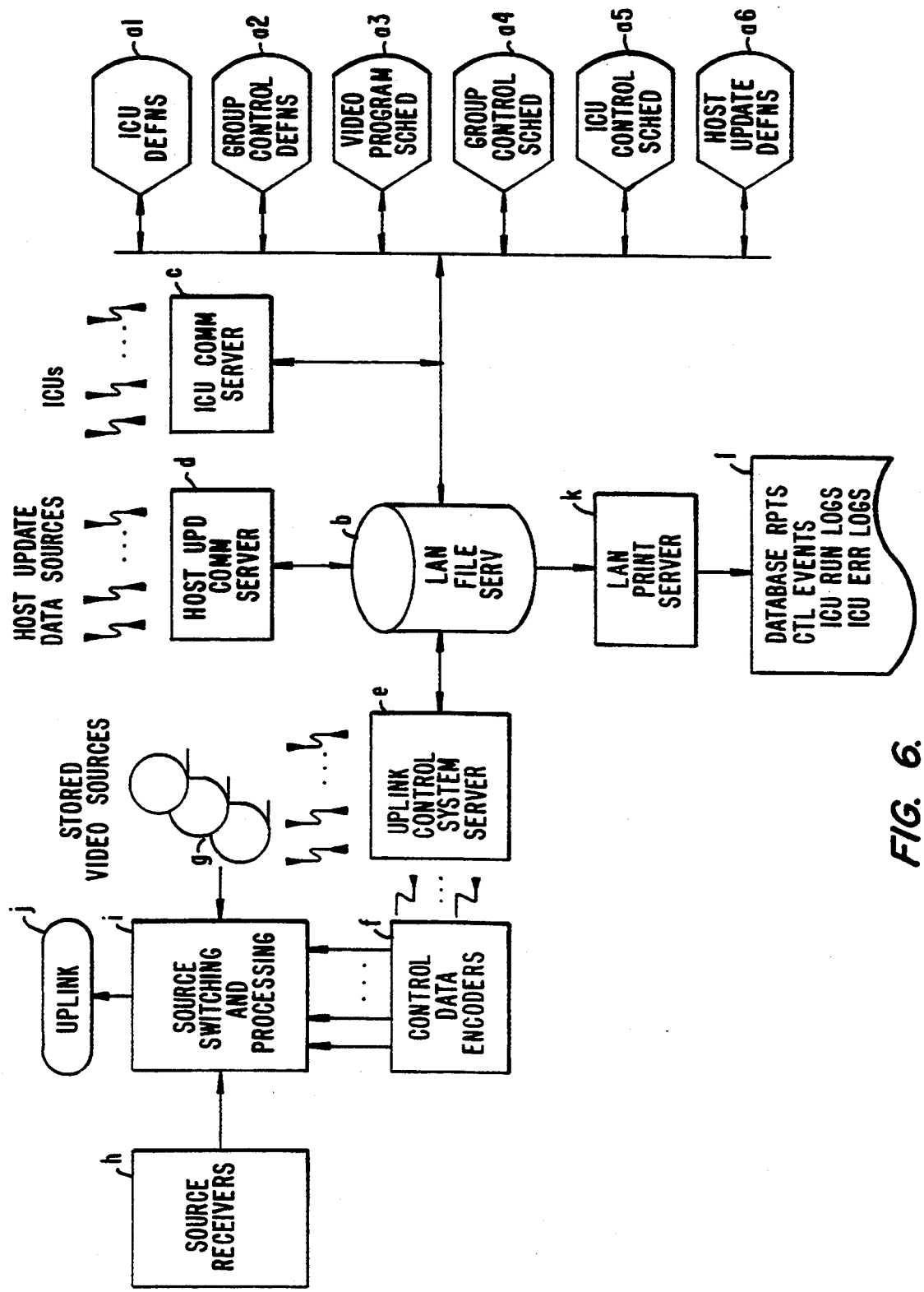
FIG. 6 is a data flow diagram of the uplink control system of FIG. 2.

The software controlling uplink control system (UCS) 4 is illustrated in FIGS. 6 and 7. Referring to FIG. 6, the software of uplink control system 4 provides for the following major subsystems: data entry and editing (a1 through a6); centralized data storage and file service (b); communication with the insertion control units in the receiving sites (c); communication with centralized or host computers of the receiving sites (d); uplink control system services (e); encoding of control data in the video signal (f); playback control of video source material on programmable video tape or disks (g); reception of satellite or terrestrial video signals (h); video source switching and processing (i); satellite uplink (j); and printing (k and l) for the database file-saver (b) and for verification and alarm messages collected from communicating with the insertion control units (c) and with the receiving site host computers (d).

A preferred embodiment of the UCS 4 employs a local area network (LAN) with the uplink control system services (e) residing on system control computer 26. The other major services on the LAN, namely, receiving site host communications, receiving site insertion control unit communications, data entry and editing, file services and print services are, in a preferred embodiment, also on separate computers, but other implementations could combine some or all of the illustrated servers into a minicomputer or mainframe computer. The LAN itself could be eliminated by using a computer which combined all the communications, control, database and data entry functions with a multitasking operating systems and appropriate communications controllers and peripherals.

1. Data Entry and Editing

A multi-user database management system is employed in the file services (b) of the UCS, to support the data entry and editing functions (a1 through a6) on full-screen terminals. Some or all of these data entry and editing functions may reside on traffic control computer 24.

The insertion control unit definitions database (a1) includes, for each insertion control unit: the unique insertion control unit hardware address and release level, group membership codes, receiving site description and location, host computer protocol type, modem phone number, receiving site storage bank descriptor codes, and routing switcher descriptor codes. Database (a1) will also include store section or aisle codes, and any other codes associated with routing of programs within a particular receiving site.

The group control definitions database (a2) defines the members of control groups such as retail store chains, geographic regions, and the like. Insertion control units can be grouped by any information fields contained in the insertion control unit definitions database. Some of these groupings can be transmitted to the insertion control units for permanent storage as part of the control profile of the unit (as described below); other groupings can be set up ad hoc, and are individually transmitted to the insertion control unit with the control data embedded in the video signal.

The video program schedule (a3) describes the individual video programs or segments on all the video channels flowing through the uplink (j): event name, event serial number, channel number, start date and time and stop date and time.

The group control schedule database (a4) defines the control commands for the insertion control units within a particular group: switching commands according to events in the video program schedule, and recording, cueing and playing of video program segments in the receiving site's video storage bank. The group control schedule data includes a group identification code, or address control event type and timestamp.

The insertion control unit control schedule (a5) is the individual unit case of the group control schedule, and, in some embodiments, these two data entry and editing functions could be combined into a single database.

The host update definitions database (a6) defines the data flowing from the UCS to the receiving site host computers. It may be entered at an editing station, and kept in a text file; or it may be received from the host computer communications server (d), in which case it is classified on the date entry and editing stations. The update data is scheduled for specific insertion control units at specific timestamps or time ranges, the protocol employed by the receiving site host computer is classified and verified by comparing with the insertion control unit definitions database

2. Host Update Communications

The organizations being served by the distribution network may have one or more centralized computers not necessarily located at the receiving site. Therefore, a host communications service (d) is provided to receive updates from an organization's centralized computer for distribution to the host computers for each insertion control unit in the organization. In this way, an update transmitted from the organization's centralized computer to UCS 4 may be assured of delivery to many locations, via the same datalink delivering the video programming material.

One or more protocol support suites may therefore be provided in the host update communications server (d) for communication with host or centralized organizational computers. Data received from these computers is stored in the file server (b) and classified for distribution through the host update definitions editing station(s) (a6).

3. Insertion Control Unit Communications

As the insertion control units 56 perform their function, they collect verification logs and failure/alarm information with respect to the commands and other control data received. When certain kinds of failure occur, it is desirable to have the insertion control unit 56 dial the UCS and transmit descriptions of those failures for corrective actions and analysis. Also, the advertisers and other providers of video for the UCS commonly want to have the statistical verification that their video was received and delivered to the organizations being served.

Therefore, an insertion control unit communications server (c) is provided in the UCS in order to receive the verification logs and failure/alarm data. Usually, the insertion control unit communications server (c) resides in the verification data processing computer 48. The insertion control unit communications server handles multiple telephone modems 50, and transmits the data and logs of communications with the insertion control units on the UCS file server (b). It also uses the insertion control unit definitions database (a1) to verify proper usage of its facilities to prevent illegal access.

4. File Services and Print Services

The UCS must have file services (b) capable of storage and keyed retrieval and reporting (k and 1) for all the databases defined and edited (a1 through a6), or received from remote insertion control units (c) and organizational host computers (d). The UCS therefore provides standard multi-user access facilities and controls.

The databases (a1–a6) maintained in the file server of the UCS are constantly accessed by the Uplink Control System Server (e), in order to determine the schedule and dataflow through the encoders (f).

The preferred software embodiment of file server (b) is a fourth generation database package such as Oracle, Paradox, RMS, IMS, or the like. The actual choice is limited by the chosen hardware and operating system supporting the file server.

All such packages have built-in report generators capable of delivering formatted reports to the file server (k) and attached printer (l).

5. Uplink Control System Server

All control data and messages bound for the receiving site insertion control units must flow from the file server (b) through the uplink control system server (e) to the encoders (f) in order to be combined with the uplink video signal, composed of received video signals and/or video programming stored on videotape and/or disk (g, h, and i).

Stored programming must be cued, played, and switched according to the video program schedule developed and maintained in program schedule database (a3) through traffic control computer 24.

Figures 7A, 7B:
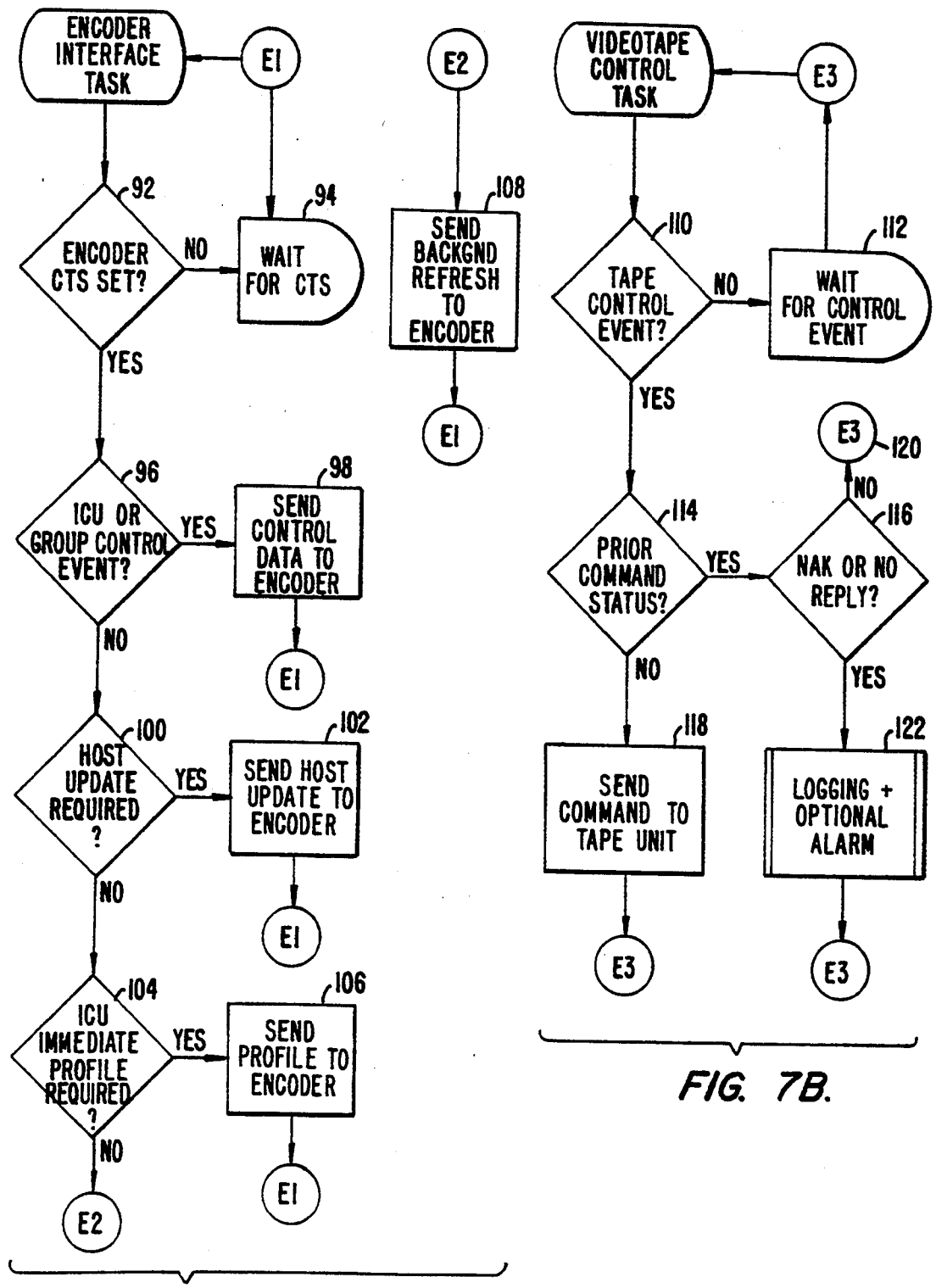
FIGS. 7A-7B are software flow diagrams of the software running the uplink control system of FIG. 2.

Referring now to FIGS. 7A–7B, it will be seen that the uplink control system server (e) is driven by the command, control and insertion control unit host data stored in the file server (b). It is delivered according to the video program and control event schedule prepared by traffic control computer 24.

The UCS server (e) has two principal tasks: an encoder interface task and a videotape (and/or videodisk) control task.

a. Encoder Interface Task

The video data encoder (f) is responsible for delivering a datastream to the video processing units (i) which can be combined with a video signal, and therefore must control the input rate allowed from the UCS server (e). In a preferred embodiment, hardware flow control is used to accomplish this purpose, such as Request To Send/Clear to Send (RTS/CTS) logic.

As illustrated in FIG. 7A, the encoder interface task (E1) continually checks the communication line with the encoder (92) and waits until the encoder sends a high CTS signal (94). When the encoder sends a high CTS signal, the encoder interface task (E1) of the UCS server (e) is allowed to send data to the encoder (f) (98, 102, 106). Otherwise, the encoder interface task (E1) must wait to transmit.

During idle and non-idle periods, the interface task (E1) continuously checks the various databases of definitions and schedules in order to build a minimum of four prioritized queues of insertion control unit data messages. Therefore, when a high CTS signal is received, the interface task chooses messages from the various queues by queue priority, and, within a particular queue, according to scheduled delivery time.

The highest priority queue is the insertion control unit and group control event queue (96). These are the commands and other control data associated with video channel switching and stored video source control in the receiving site.

The next highest priority queue is host computer data updates (100), such as product price changes received from an editing station (a6) or the host update communications server (d).

The next highest priority queue is the insertion control unit initial control profile download (104), typically required at the time an insertion control unit is installed. The control profile is a set of codes and commands stored in the insertion control unit. When a particular code is read from the control data in the video signal, it triggers a set of commands to be recalled from the control profile. This eliminates the need to send all such commands with the video signal. A request for a control profile download is input through the insertion control unit definitions editing station (a5).

The lowest priority queue is a background refresh of control profiles of all downlink insertion control units (108). Periodically, the control profiles in the insertion control units may require updating, due to corruption from hardware faults, power fluctuations or the like. By providing a periodic refresh of control profiles, a continuous quality assurance check can be performed to validate and correct the control profile.

b. Videotape Control Task

The video program schedule entered and edited through traffic control computer 24 and stored in video program schedule database (a3) determines a set of video source control operations for handling video source material destined for the uplink. These operations include cueing, start/stop, rewind, and video switching into target channels of the multi-channel output of the video playback device 32 of the UCS. It will be understood that the particular type of medium used for video storage is not critical, and that a similar routine will be used for control of VCRs, optical disk players, or other video playback devices.

As shown in FIG. 7B, the Videotape Control Task (E3) continuously checks the video program schedule for events which require video playback control commands (110), and produces a time-ordered command message queue as a result.

When the videotape control task (E3) identifies a tape control event, the appropriate command is issued to the video playback devices 32 (118), which will send an acknowledgement back to the videotape control task (E3). For each command issued, a verification process is initiated. While checking the schedule for additional commands, the status of each prior command is evaluated (114) as acknowledgements come in from the video playback device which received the command.

When a prior command receives a negative acknowledgement or no reply, for operations which can be restarted, the videotape control task repeats the command (120). In addition, backup playback devices may be designated for automatic use when they are already on-line with duplicate source material. In the event of an unrestartable command with no backup playback device on-line, an alarm is issued for an operator to take corrective action and/or replace the failing playback device (122).

A preferred embodiment of the video playback device subsystem includes redundant drives with automatic backup switching. Whenever possible, videodisks are used instead of videotape, since they usually yield a much higher mean time between failure. A preferred embodiment of the Videotape Control Task (E3) supports videotape and videodisk control protocols which can be assigned independently to each of the task's Input/Output paths.

B. INSERTION CONTROL UNIT LOGIC

The software of the Insertion Control Unit 56 of each receiving site will now be described with reference to FIGS. 8A–8F.

The Insertion Control Unit functionality is governed by the control data messages received with the video signal. Monitoring of these messages is performed by the Data Receiver Message Task (T1). Execution of tape (or other storage device) commands is controlled by the VideoTape Control Task (T10). Data to be communicated back to the UCS 4 is controlled by the Modem Control Task (T6). Any updates for a receiving site's host computer 70 are controlled by the Host Data-Comm Task (8).

1. Data Receiver Message Task

Figure 8A:
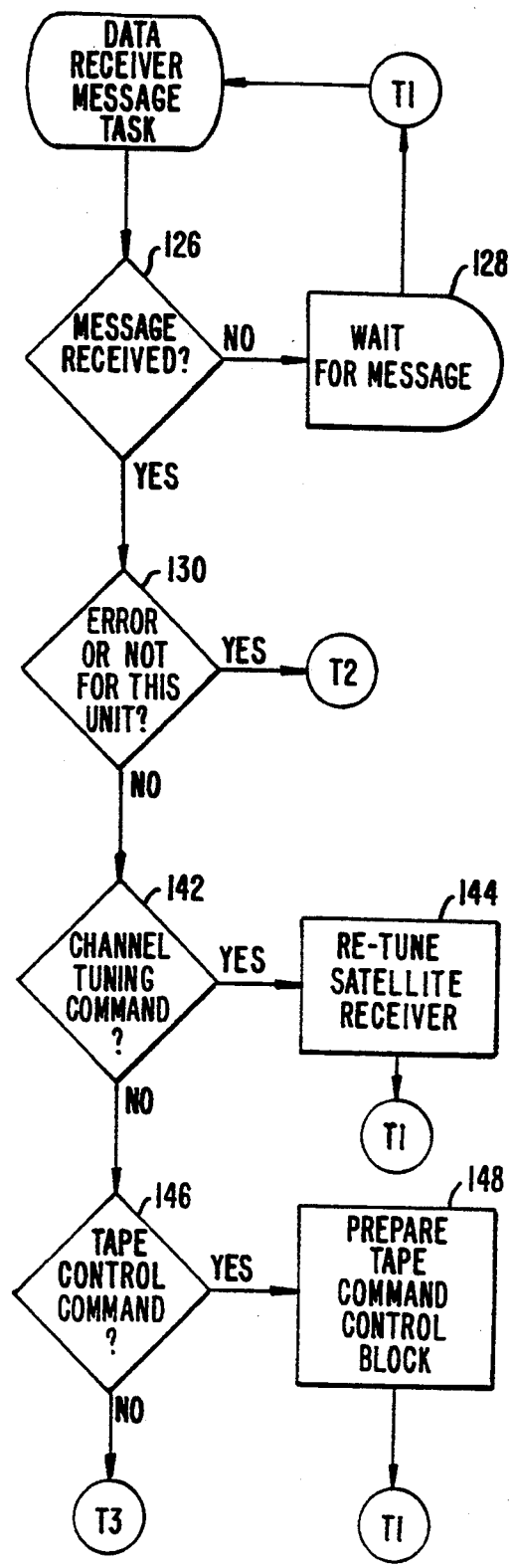
FIGS. 8A-8F are software flow diagrams of the software running the insertion control unit of FIG. 5.

Referring to FIGS. 8A–8E the Data Receiver Message Task (T1) has a main loop driven by the receipt of messages from receiver 54. As illustrated in FIG. 8A, the task continually waits and checks for the receipt of incoming messages (126, 128). A variety of well-known methods can be employed to detect completion of message transmission: In synchronous receivers, messages are identified with sync characters and the hardware automatically generates triggers at the end of reception of CRC data, which can be connected to an interrupt control line of the processor. In asynchronous messages, message completion can be determined by lengths associated with message op-codes, or by embedded length bytes in the message, or by time intervals of agreed-upon length following receipt of data.

Address recognition techniques are also commonly employed in synchronous transmission so that the processor can ignore data received from other locations via the satellite communications link. If asynchronous transmission is used, the processor is actively involved in the receipt of all data bytes and determines whether to continue processing or discard the message.

Figure 8B:
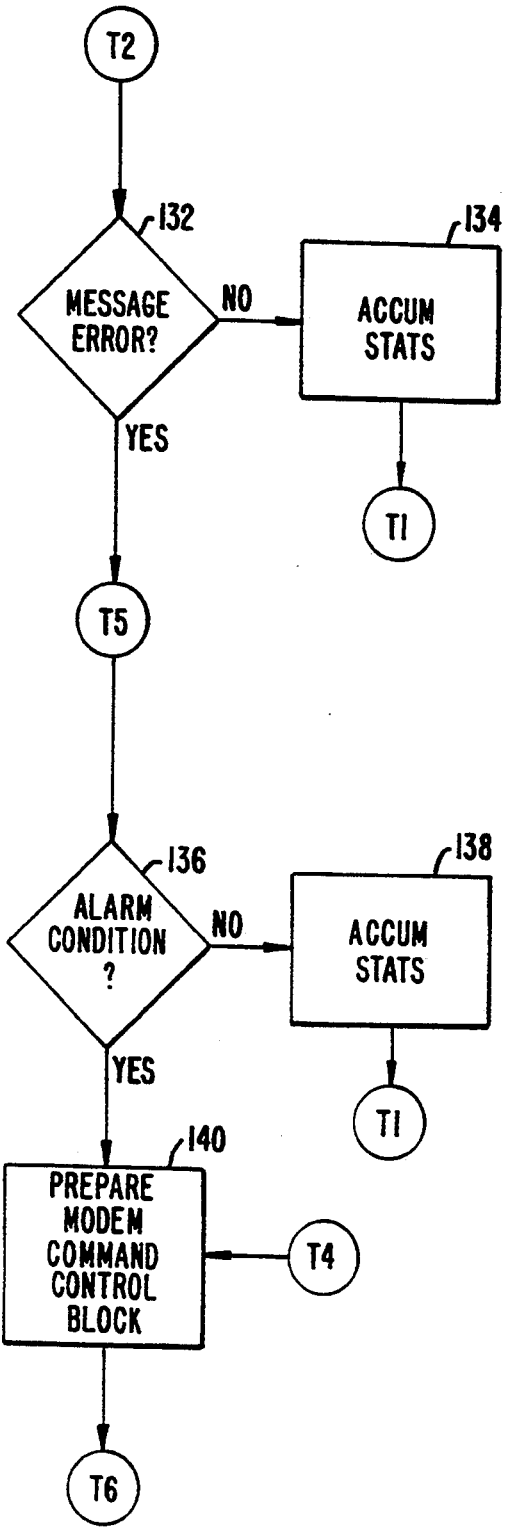

Messages received which are intended for other insertion control units are identified (130) and, in task T2, counted for statistical purposes (134) (see FIG. 8B). Messages received with CRC errors or other data format and protocol errors are, in a preferred embodiment, counted in order to provide reliability statistics for modem transmission to the Uplink Control System 4 (138).

If a sufficiently large percentage of messages are received in error, a preferred embodiment of the Data Receiver Message Task generates an alarm condition (136), prepares a modem command control block (140) and alerts the Modem Control Task (T6) that it must prepare and forward the alarm message.

Valid messages for the insertion control unit 56 include but are not limited to: video channel switching/tuning commands; tape (or other storage device) control commands; modem control commands; host data messages; and insertion control unit profile updates or refreshes.

When a switching/tuning command is received (142), the insertion control unit processor communicates the new channel to the receiver 54 (144).

When a tape control command is received (146), a tape command control block is prepared for processing in the VideoTape Control Task T10 (148).

Figure 8C:
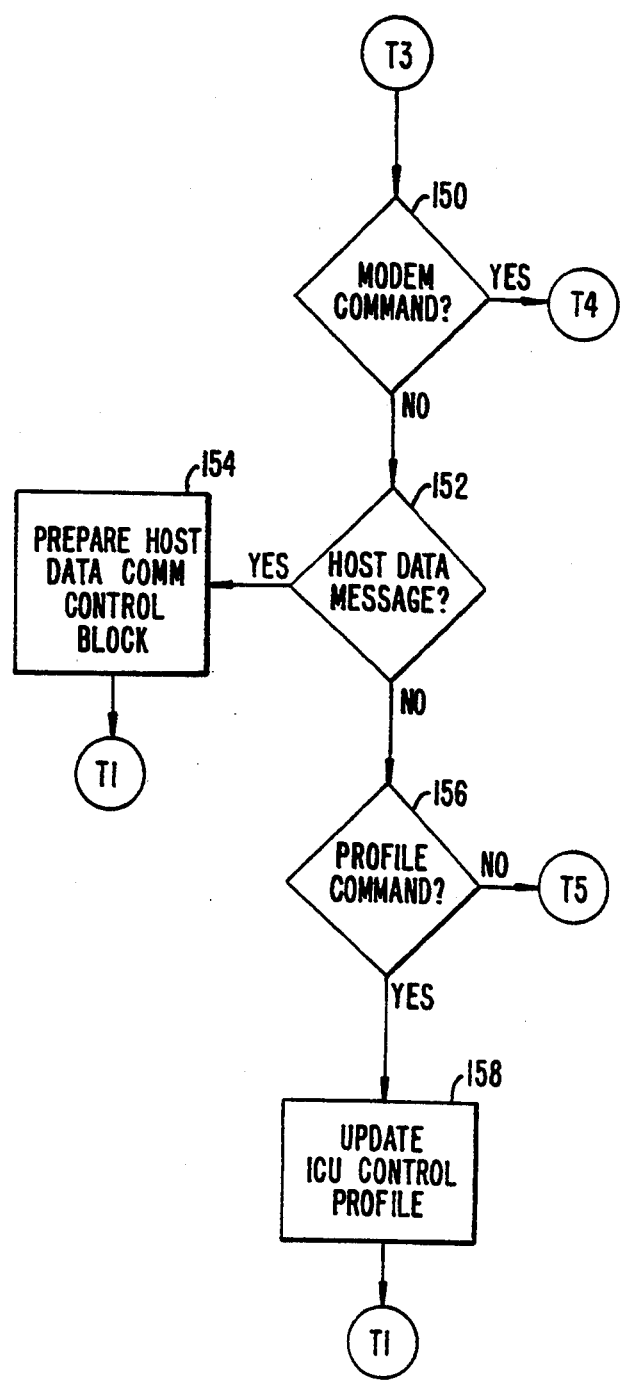

As shown in FIG. 8C, when a modem command is received (150), a modem command control block is prepared for processing by the Modem Control Task T6 (140).

When a host data message is received (152), a host datacomm control block is prepared for processing by the Host DataComm Task T8 (154).

When an insertion control unit profile update command is received (156), the command profile stored in memory units 64, 66 is updated (158).

The commands and other control data received may further require the updating of statistics and event log information contained in memory unit, for future reporting and verification of events to the Uplink Control System 4.

After proper routing and control block preparation, the data receiver message task resumes its primary loop, waiting for another message to be received (128).

2. VideoTape Control Task

In a preferred embodiment, the Videotape Control Task (T10) is driven by control blocks prepared by the Data Receiver Message Task (T1). The control blocks specify start record, stop record, cueing up, start play, and stop play operations for the video storage bank 72. Since receiver 54 must be switched to the local tape or other video storage device for playback of locally stored video segments, the videotape control task also controls the function of routing switcher 74. It will be understood, of course, that optical disks or other video storage media could be used in conjunction with or as an alternative to videotape.

Figure 8D:
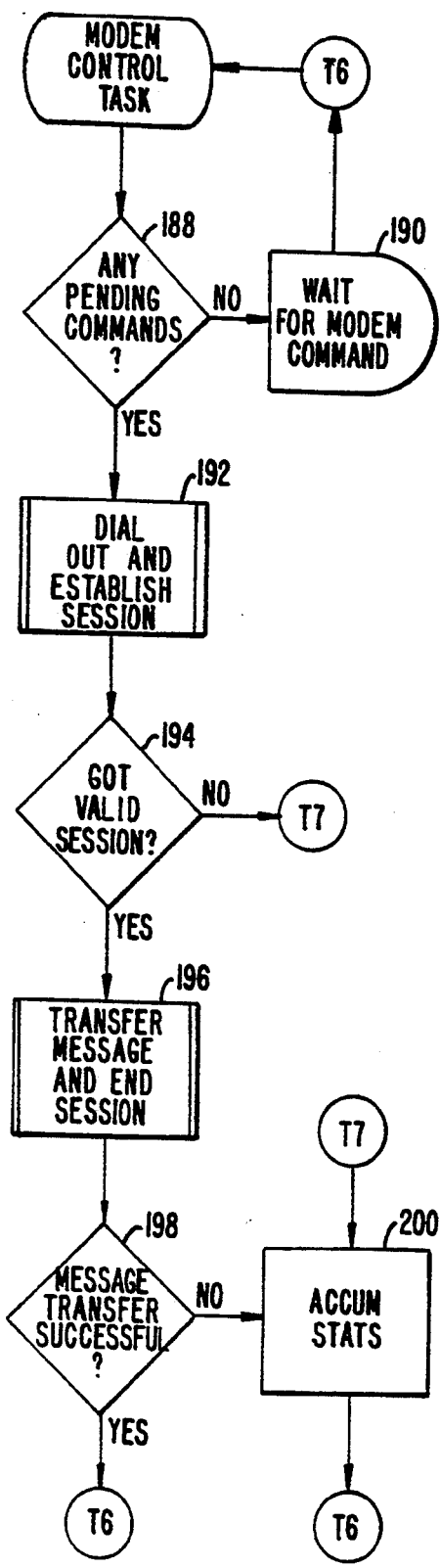
Figures 8E, 8F:
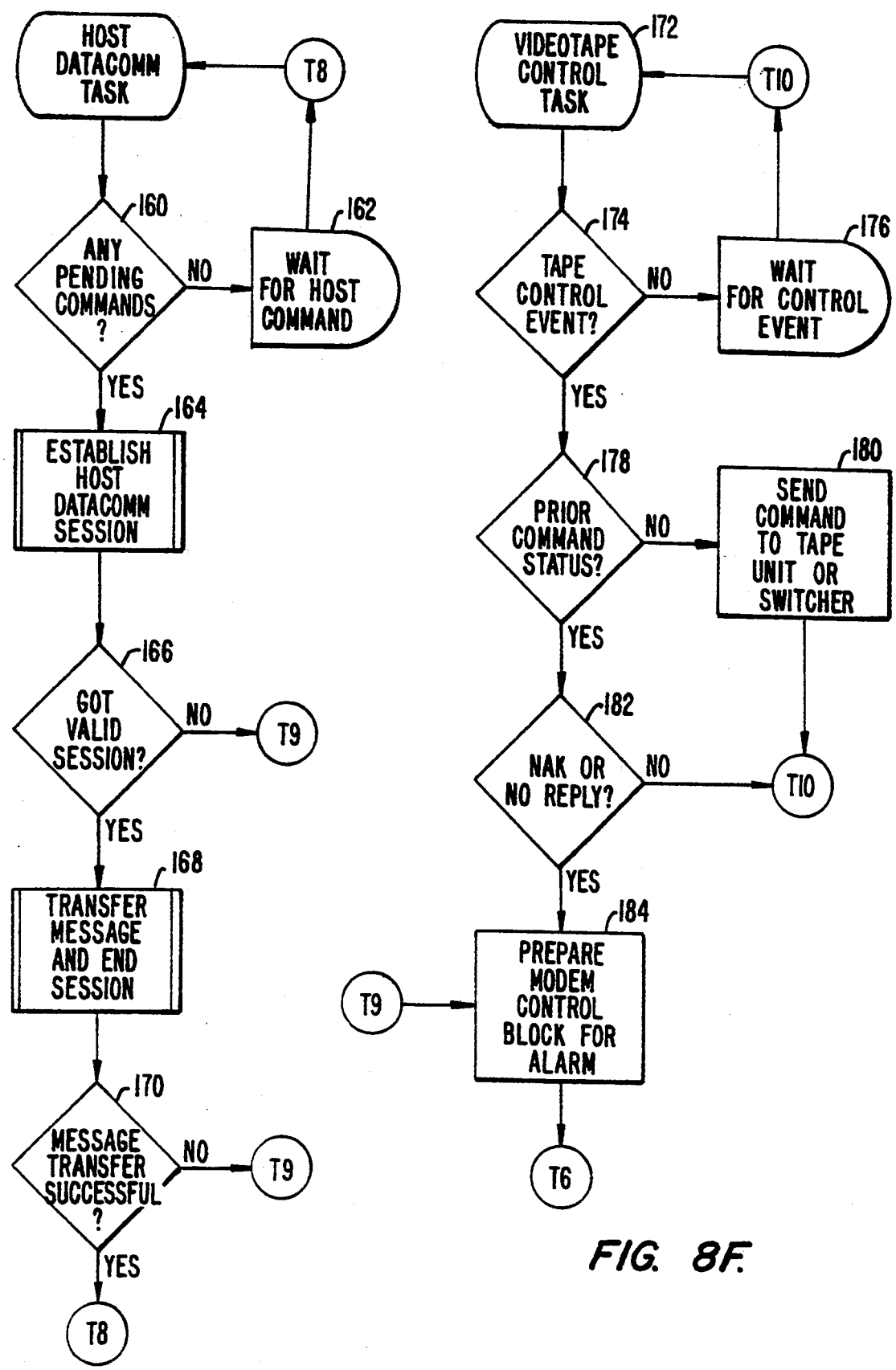

Referring to FIG. 8F, the videotape control task T10 waits until a tape control event message is received from the data receiver message task T1 (174, 176). The task then checks the status of prior commands sent to the storage bank 72, and, if all prior commands have been acknowledged (178), sends the tape control command to storage bank 72 or to routing switcher 74 (180).

Just as in the Uplink Control System, the VideoTape Control Task in the insertion control unit checks for proper completion of prior commands issued to the video storage hardware, and, in the event of errors (182), prepares a modem control block (T9) to generate an alarm message to be forwarded by the Modem Control Task T6 to the UCS 4 (184).

3. Host DataComm Task

In a preferred embodiment, the Host DataComm Task (T8) is driven by control blocks prepared by the Data Receiver Message Task (T1) specifying the messages or packets of data to send to an organization's central computer or local host, or to a protocol interface device. As shown in FIG. 8E, the host datacomm task (T8) waits for host command from the data receiver message task (T1) (160, 162). When a command is received, the task establishes communication with the host computer 70 (164). The data message is then transferred to the host 70 (168).

The host datacomm task (T8) employs one of a selected list of standard message and file transfer protocols, which are defined in the insertion control unit control profile. Failure to establish a communications session (166) or failure to transmit messages (170) results in the preparation of a modem control block (T9) to generate an alarm message to be forwarded by the Modem Control Task (T6) to the UCS 4.

4. Modem Control Task

In the preferred embodiment, the Modem Control Task (T6) is driven by control blocks prepared by the Data Receiver Message Task (T1), the VideoTape Control Task (T10), and the Host Datacomm Task (T8). These control blocks call for the transmission, by dial-out and telecommunications to the UCS 4, of control data verification data and statistics, as well as alarm messages resulting from malfunctions which require that maintenance be performed on the insertion control unit 56 or its attached peripherals, such as the video storage devices in storage bank 72.

As illustrated in FIG. 8D, the task (T6) waits to receive a modem command from the data receiver message task (T1) (188, 190). When a modem command is received, the task dials out and establishes communication with the UCS 4 through modem 50 (192). When a valid communication session has been obtained, the task transfers the message through the modem 50 and ends the session (196).

During actions taken in response to a request represented in a control block, failure to establish communication (194) or transmit data (198) causes the modem control task to mark and retain the corresponding control block (200) so that retry attempts may be initiated after a delay time specified in the insertion control unit control profile. And, in the event of such failure, appropriate statistics are updated (200) for later transmission or for local readout to a maintenance technician.

Upon completion of the requested transmission, the modem control task (T6) returns to its primary loop waiting for another control block to be defined by one of the associated tasks.

While the above is a complete description of the preferred embodiments of the invention, various alternatives, modifications, and equivalents may be used. For example, in some instances, non-satellite forms of distribution from the distribution center, such as cable transmission, may be appropriate. Further, the invention could be used for purposes other than advertising, such as providing educational programs in schools, or providing entertainment in restaurants, airports, and the like. Therefore, the above description should not be taken as limiting the scope of the invention which is defined by the appended claims.

What is claimed is:

1. A video media distribution network comprising:
   a central distribution center having means for transmitting a network-wide video program and market-specific segments to a plurality of receiving sites in stores each having an associated address, said market-specific segments including a destination address and a set of control data encoded therein, wherein the receiving sites comprise:
   means for receiving said network-wide video program and said market-specific segments;
   means for reading the destination address in said market-specific segments;
   means operative when the destination address matches the associated address of the receiving site for inserting the market-specific segments into the network-wide video program according to commands contained in the control data to produce a customized program; and
   means for displaying the customized program on television monitors in said stores.

2. The video media distribution network of claim 1 wherein the network-wide video program and the market-specific segments comprise full motion video program segments.

3. The video media distribution network of claim 1 wherein the means for transmitting comprises a satellite.

4. The video media distribution network of claim 1 wherein the means for transmitting transmits an analog signal.

5. The video media distribution network of claim 1 wherein the means for transmitting transmits a digital signal.

6. The video media distribution network of claim 1 wherein the network-wide program is transmitted over a first channel and the market-specific segments are transmitted over a second channel, the means for inserting comprising means for selectively switching between the first and the second channels according to switching commands in said control data.

7. The video media distribution network of claim 1 wherein said receiving sites are divided into a plurality of sections each having a section associated address, the market-specific segments further having a section destination address readable by said means for reading, whereby the means for inserting produces an aisle-customized program for each section.

8. The video media distribution network of claim 1 wherein a plurality of said receiving sites comprise a group having a group associated address, the market-specific segments further having a group destination address readable by said means for reading, whereby the means for inserting in each of the receiving sites of the group produces a group-customized program.

9. A network for distributing video programs from a central distribution center to geographically dispersed retail stores, each store having an associated address, the network comprising:
means in the distribution center for playing back a network-wide program over a first channel;
means in the distribution center for playing back market-specific segments over at least a second channel;
means in the distribution center for encoding the market specific segments with a destination address and a set of control data;
means for transmitting the network-wide program and market-specific segments to the stores;
a receiver in each store for receiving the network-wide program and market-specific segments, the receiver having means for switching between said first and second channels;
a controller coupled to the receiver, the controller having means for reading the destination address and means for directing the receiver to switch between said first and second channels when the market-specific segments have a destination address corresponding to the store's associated address; and
at least one video display device coupled to the receiver for displaying the network-wide program with the market specific segments having the store's associated address inserted therein.

10. The network of claim 9 wherein the network-wide program and market-specific segments are transmitted via satellite from the distribution center to the retail stores, the satellite having a plurality of transponders.

11. The network of claim 10 wherein the network-wide program and market-specific segments are transmitted in analog signals.

12. The network of claim 11 wherein the destination address and control data are encoded in a vertical blanking interval in the analog signals.

13. The network of claim 11 wherein the destination address and control data are encoded on a subcarrier channel.

14. The network of claim 11 wherein the network-wide program is transmitted through a first transponder of the satellite, and the market-specific segments are transmitted through at least a second transponder of the satellite.

15. The network of claim 14 wherein the means for switching tunes the receiver to receive signals from one of either the first or the second transponder.

16. The network of claim 10 wherein the network-wide program and market specific segments are transmitted in digital signals.

17. The network of claim 16 further comprising means in the distribution center for compressing the digital signals.

18. The network of claim 16 wherein the network-wide program and market specific segments are transmitted through a single transponder of the satellite.

19. The network of claim 18 wherein the means for switching switches between the first and second channels with receiver remaining tuned to the same transponder.

20. The network of claim 16 wherein the destination address and control data are encoded on a digital data channel separate from the first and second channels.

21. The network of claim 9 wherein the stores include a plurality of sections having a section associated address, the destination address comprising a section address whereby the controller produces a section-customized program for each section by directing the receiver to switch from the network-wide program to the market-specific segments having a section address corresponding to the section associated address.

22. The network of claim 21 wherein the sections comprise individual aisles in the stores.

23. The network of claim 9 further comprising at least one group of retail stores having a group associated address, the destination address comprising a group address whereby the controller produces a group-customized program for each group by directing the receiver to switch from the network-wide program to the market-specific segments having a group address corresponding to the group associated address.

24. The network of claim 23 wherein the group comprises a plurality of retail stores of a retail chain.

25. The network of claim 23 wherein the group comprises a plurality of retail stores within a selected geographic region.

26. The network of claim 21 further comprising a cable network within each store, each aisle having a television set connected to the cable network and tuned to one of a plurality of cable channels, wherein selected televisions receive an aisle-customized program on one of the cable channels.

27. The network of claim 9 further comprising means coupled to the receiver for storing the network-wide program and market-specific segments for time-delayed playback.

28. The network of claim 27 wherein the means for storing is responsive to storage commands contained in said control data.

29. The network of claim 28 wherein the controller further comprises means for selectively recalling the network-wide program and market-specific segments from the means for storing in response to said storage commands.

30. The network of claim 9 further comprising a control computer in the distribution center for controlling the means for encoding.

31. The network of claim 30 wherein the control computer further controls the means for playing back the network-wide program and the means for playing back the market-specific segments to play back the network-wide program and market-specific segments at selected times.

32. The network of claim 9 further comprising a store host computer coupled to the controller in at least one of the retail stores, the control data including host messages directed at the store host computer, wherein the controller transmits the host messages to the store host computer.

33. The network of claim 32 wherein the host messages comprise information taken from the group including product promotional information, discount information, pricing information, and coupon information.

34. The network of claim 9 further comprising a data communications link between the controller and the distribution center for transmitting information taken from the group including reception verification, alarm messages, and statistical information.

35. The network of claim 31 wherein the control data comprises modem commands for controlling data communications.

36. The network of claim 9 wherein the network-wide program and market specific segments comprise full motion video program segments.

37. The network of claim 9 wherein the video display device comprises a television set.

38. A network for distributing video programs from a distribution center to geographically dispersed retail stores, each store having an associated address, the network comprising:
   means in the distribution center for playing back a network-wide program over a first channel;
   means in the distribution center for playing back market-specific segments over at least a second channel;
   means in the distribution center for encoding the market specific segments with a destination address and a set of control data, the means for encoding further encoding the destination address in the network-wide program at a point coinciding with the position of the destination address in the market-specific segments;
   means for transmitting the network-wide program and market-specific segments to the stores;
   a receiver in each store for receiving the network-wide program and market-specific segments, the receiver having means for switching between said first and second channels;
   a controller coupled to the receiver, the controller having means for reading the destination address and means for directing the receiver to switch between said first and second channels when the market-specific segments have a destination address corresponding to the store's associated address; and
   at least one video display device coupled to the receiver for displaying the network-wide program with the market specific segments having the store's associated address inserted therein.

39. A method of broadcasting a plurality of customized video programs to a plurality of receiving sites in stores each having an associated address, the method comprising:
   encoding each of a plurality of market-specific segments with a destination address;
   transmitting a network-wide program and the market-specific segments to the receiving sites in said stores, the network-wide program being transmitted on a first channel and the market-specific segments being transmitted on a second channel;
   receiving the network-wide program and market-specific segments at each site;
   reading the destination address in each market-specific segment;
   inserting the market-specific segments having a destination address matching the associated address into the network-wide program to produce the customized program; and
   playing the segments on television monitors in said stores.

40. The method of claim 39 wherein the network-wide program and market-specific segments are transmitted via satellite.

41. The method of claim 39 wherein the step of inserting comprises switching between the first and second channels.

42. The method of claim 39 wherein the network-wide program and market-specific segments are transmitted in analog signals.

43. The method of claim 39 wherein the network-wide program and market-specific segments are transmitted in digital signals.

44. The method of claim 39 further comprising encoding control data into the market-specific segments.

45. The method of claim 44 wherein a controller in each receiving site reads the control data and switches a receiver to either the first channel or the second channel according to switching commands in the control data.

46. The method of claim 39 further comprising displaying the customized program on at least one television set in each receiving site.

47. The method of claim 39 wherein the receiving sites each have a plurality of sections having a section associated address, the method further comprising encoding a section destination address in the market-specific segments, reading the section destination address at the receiving site, and displaying in each of said sections the network-wide program having inserted therein the market-specific segments with a section destination address matching the section associated address.

48. The method of claim 39 wherein the receiving sites comprise retail stores.

49. The method of claim 39 wherein the network-wide program and the market-specific segments are in full motion video format.

* * * * *